United States Patent
Todorovic et al.

(10) Patent No.: US 8,408,008 B2
(45) Date of Patent: Apr. 2, 2013

(54) SCOOP OF A RUNNING-GAP CONTROL SYSTEM OF AN AIRCRAFT GAS TURBINE

(75) Inventors: Predrag Todorovic, Berlin (DE); Stephan Herzog, Berlin (DE); Christian Seydel, Stahnsdorf (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 582 days.

(21) Appl. No.: 12/716,741

(22) Filed: Mar. 3, 2010

(65) Prior Publication Data

US 2010/0223905 A1   Sep. 9, 2010

(30) Foreign Application Priority Data

Mar. 4, 2009   (DE) .................. 10 2009 011 635

(51) Int. Cl.
*F02C 6/08* (2006.01)
*F02C 6/04* (2006.01)
(52) U.S. Cl. .......................... 60/782; 60/785
(58) Field of Classification Search .............. 60/782, 60/785, 795, 226.1
See application file for complete search history.

(56) References Cited

U.S. PATENT DOCUMENTS

| | | | |
|---|---|---|---|
| 4,849,895 A | 7/1989 | Kervistin | |
| 5,269,135 A | 12/1993 | Vermejan et al. | |
| 5,351,478 A * | 10/1994 | Walker et al. | 60/785 |
| 5,826,794 A | 10/1998 | Rudolph | |
| 6,058,696 A | 5/2000 | Nikkanen et al. | |
| 2006/0277919 A1* | 12/2006 | Martensson et al. | 60/785 |
| 2007/0140838 A1 | 6/2007 | Estridge et al. | |
| 2007/0140839 A1 | 6/2007 | Bucaro et al. | |
| 2007/0245711 A1 | 10/2007 | Stretton | |

FOREIGN PATENT DOCUMENTS

| | | |
|---|---|---|
| GB | 2442310 | 4/2008 |
| WO | 9211444 | 7/1992 |

OTHER PUBLICATIONS

German Search Report dated Jun. 8, 2011 for counterpart German patent application.

* cited by examiner

*Primary Examiner* — Gerald Sung
(74) *Attorney, Agent, or Firm* — Timothy J. Klima; Shuttleworth & Ingersoll, PLC

(57) ABSTRACT

A scoop for a fairing 1 of a core engine 2 of an aircraft gas turbine allows air to be supplied from a bypass flow in a bypass duct 3 to several cooling-air distributors in a core-engine ventilation compartment 4. The scoop includes a first tubular flow duct 5, whose inlet opening 6 is arranged in the bypass duct 3 and which extends through the fairing 1, as well as a second tubular flow duct 7, which at least partly encompasses the first flow duct 5 and whose inlet opening 8 is rearwardly offset relative to the inlet opening 6 of the first flow duct 5 in the direction of flow.

16 Claims, 5 Drawing Sheets

SCOOP OF A RUNNING-GAP CONTROL SYSTEM OF AN AIRCRAFT GAS TURBINE

Figure 1:
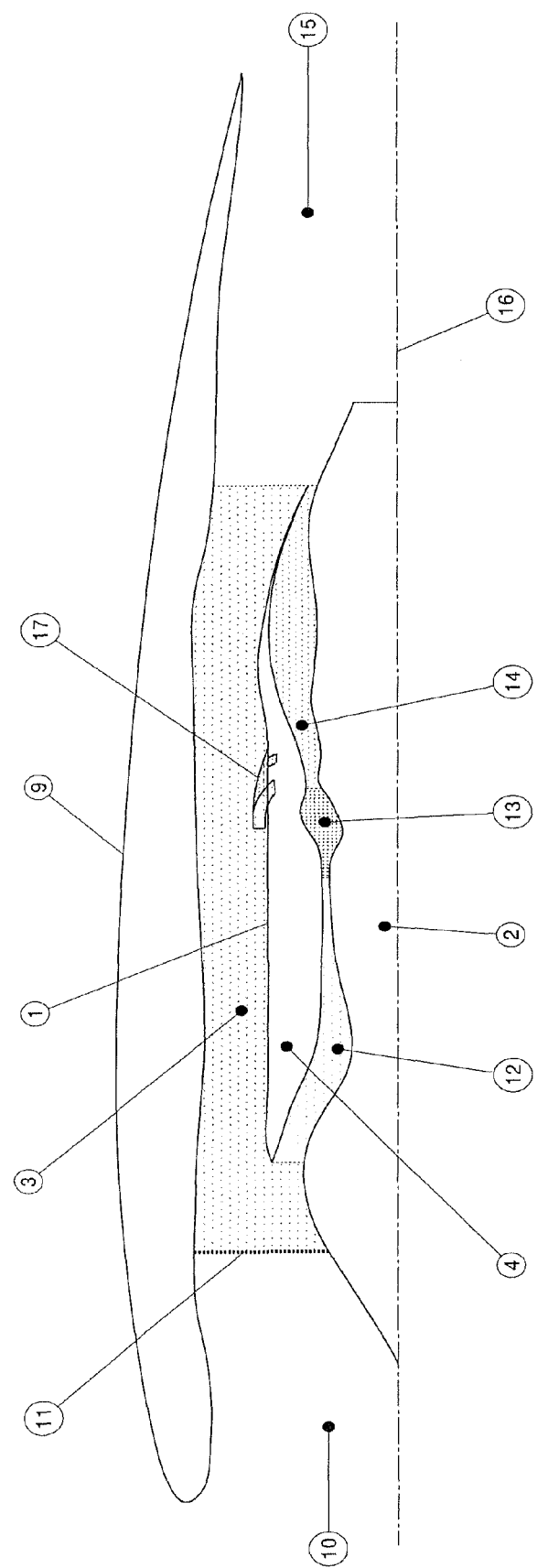

This application claims priority to German Patent Application DE102009011635.4 filed Mar. 4, 2009, the entirety of which is incorporated by reference herein.

This invention relates to a scoop used for a running-gap control system of an aircraft gas turbine to introduce cooling air from a bypass duct into a core-engine ventilation compartment.

More particularly, the present invention relates to a scoop of a fairing of a core engine of a gas turbine through which air is supplied from a bypass flow to several cooling-air distributors.

For active tip clearance control, it is known from the state of the art to branch off cooling air from a bypass duct and use it for cooling the wall of a turbine casing.

For the state of the art, reference is made to US 2007/0140839 A1 and US 2007/0140838 A1 as well as to US 2007/245711 A1.

For the introduction of cooling air, it is required to take up the cooling air from the bypass duct and route it radially inwards through the fairing of the core-engine ventilation compartment in an aerodynamically favorable, flow-oriented way.

A broad aspect of this invention is to provide a scoop of the type specified at the beginning which enables an aerodynamically optimized introduction of cooling air.

The scoop according to the present invention is characterized by a variety of considerable advantages. It is best suited, especially to remove a gas or fluid flow as partial flow from another flow without incurring major flow losses.

Accordingly, the scoop according to the present invention is not limited in application to the described active tip clearance control, but can also be used for any application in which partial fluid flows are to be removed for cooling, heating or other purposes.

In accordance with the present invention, the scoop is designed such that an aerodynamically favorable guidance of flow with low pressure and flow losses is provided. This is particularly applicable to the described combination of two fluid flows to be taken from a main flow at virtually the same location.

According to the present invention, it is furthermore particularly favorable that the scoop is easily manufacturable and includes only a small number of individual items. This simplifies the manufacturing process. It generally results in a low component weight. Owing to the simplicity of the design, with virtually no maintenance effort required, maintenance costs are likewise low.

Therefore, according to the present invention, two flow ducts are associated with each other, with a first, tubular flow duct extending through the wall or the fairing and a second flow duct at least partly surrounding the first flow duct and having an inlet opening which in the direction of flow is backwardly offset from the inlet opening of the first flow duct. This leads to the favorable effect that the two inlet openings, and the impairment of the original total flow resulting therefrom, will not negatively affect each other. Rather, provision is made for undisturbed inflow through both inlet openings, with no swirling or separation of the flow occurring.

The solution according to the present invention, in which the second flow duct at least partly encompasses or encloses the first flow duct, enables both flow ducts to be provided with an efficient and effective flow cross-section which affects the main flow only to a minimum extent and ensures efficient removal of the respective partial flows.

Figure 2:
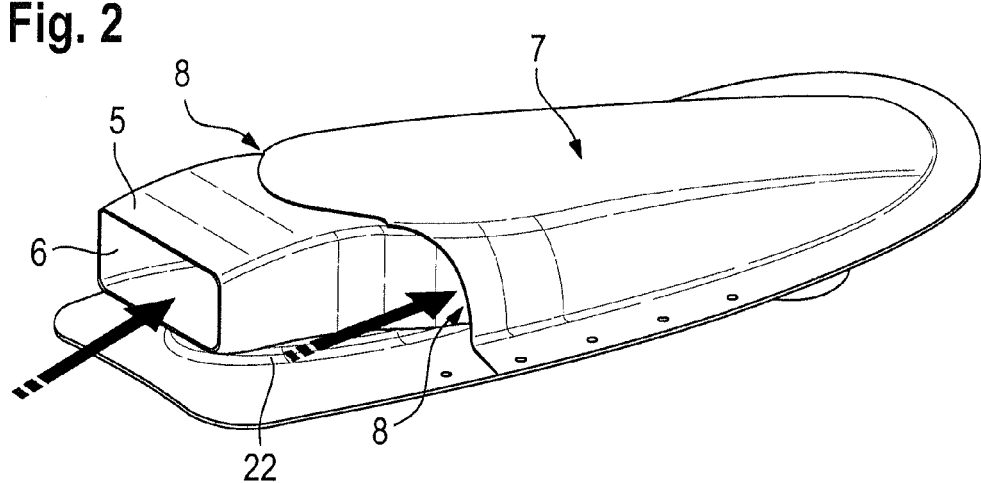
Figure 3:
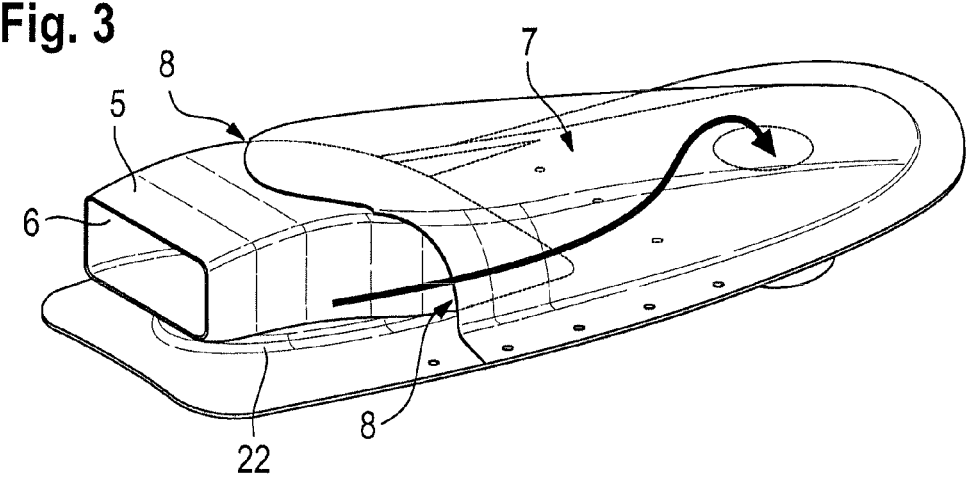
Figure 4:
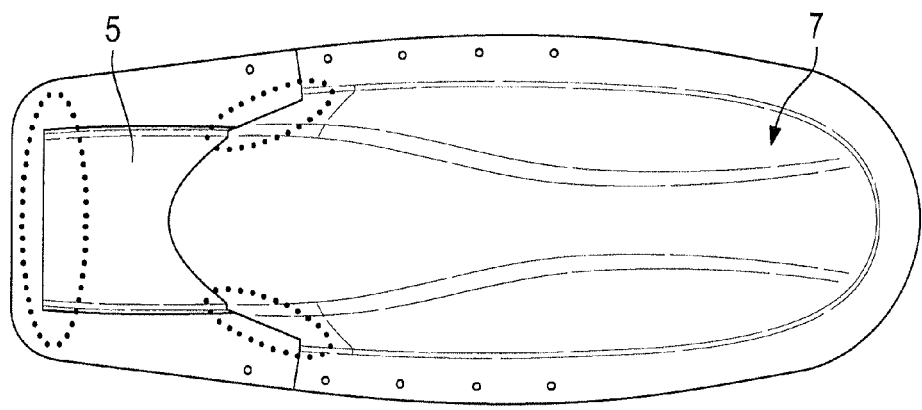
Figure 5:
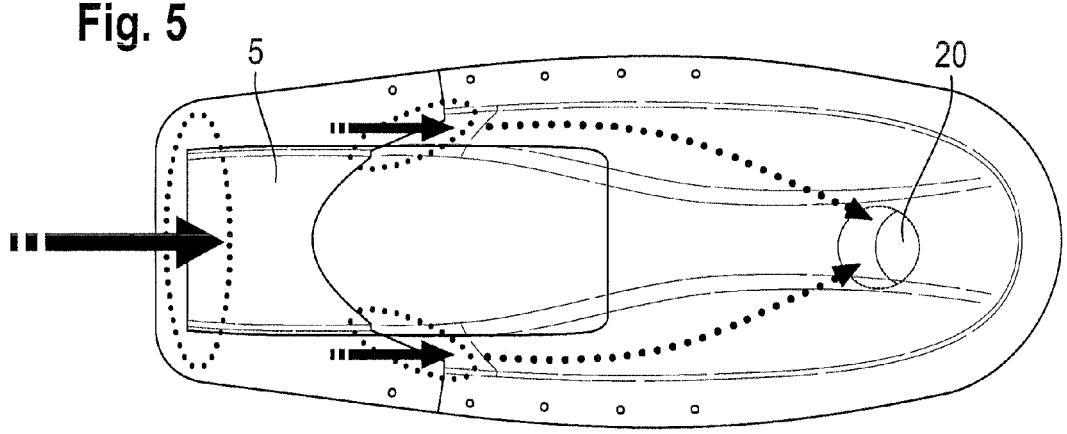
Figure 6:
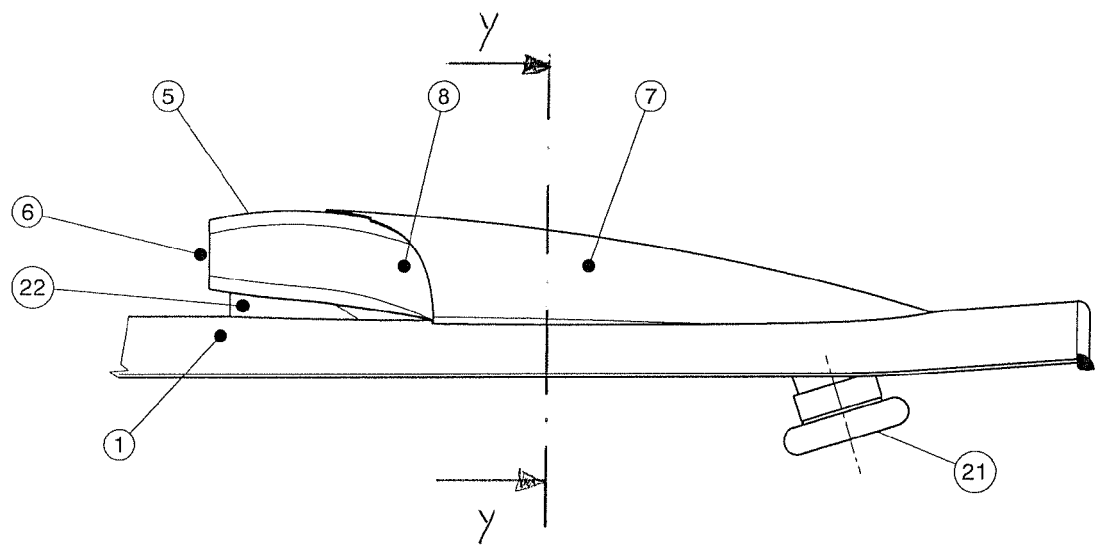
Figure 7:
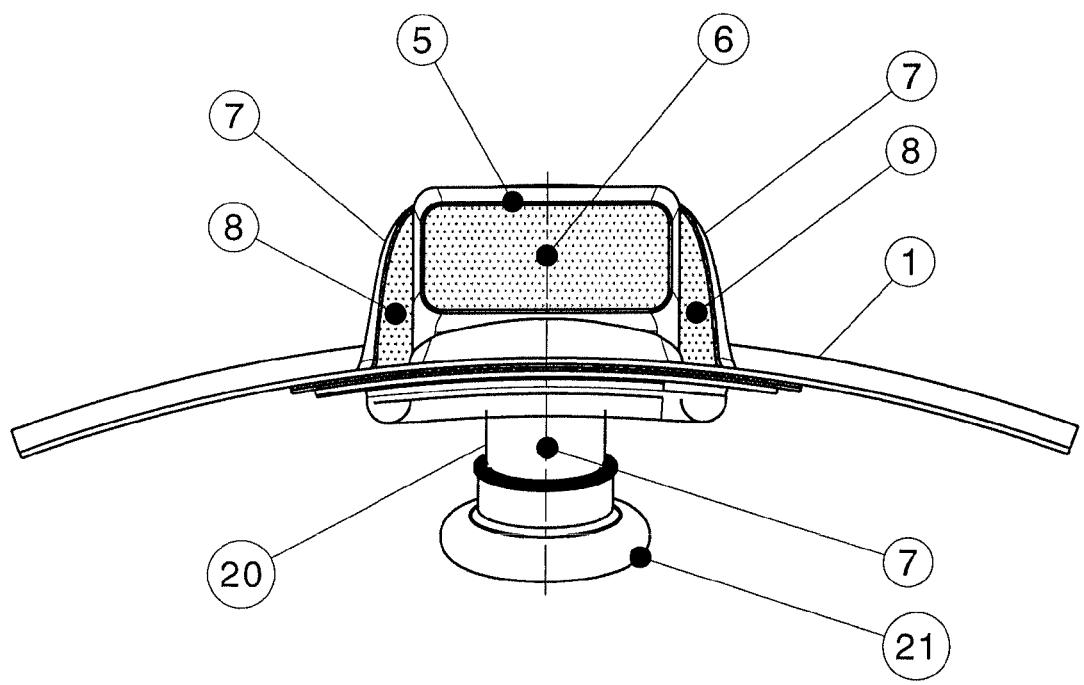
Figure 8:
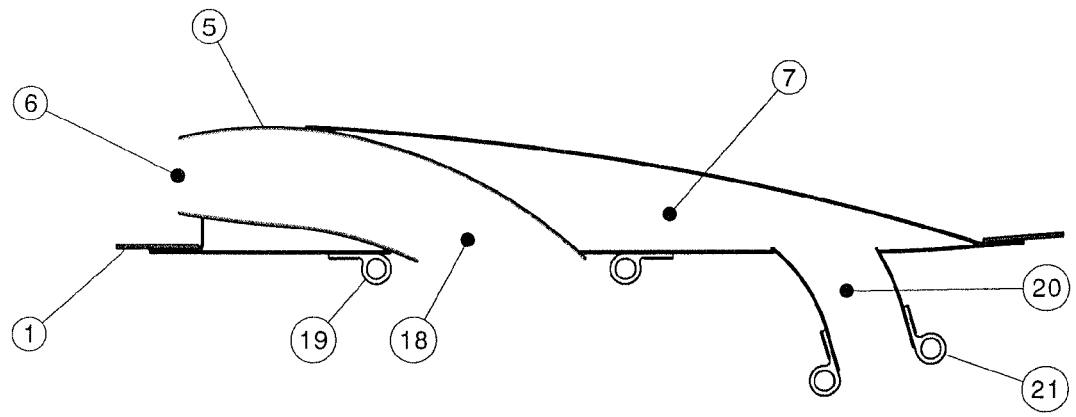
Figure 9:
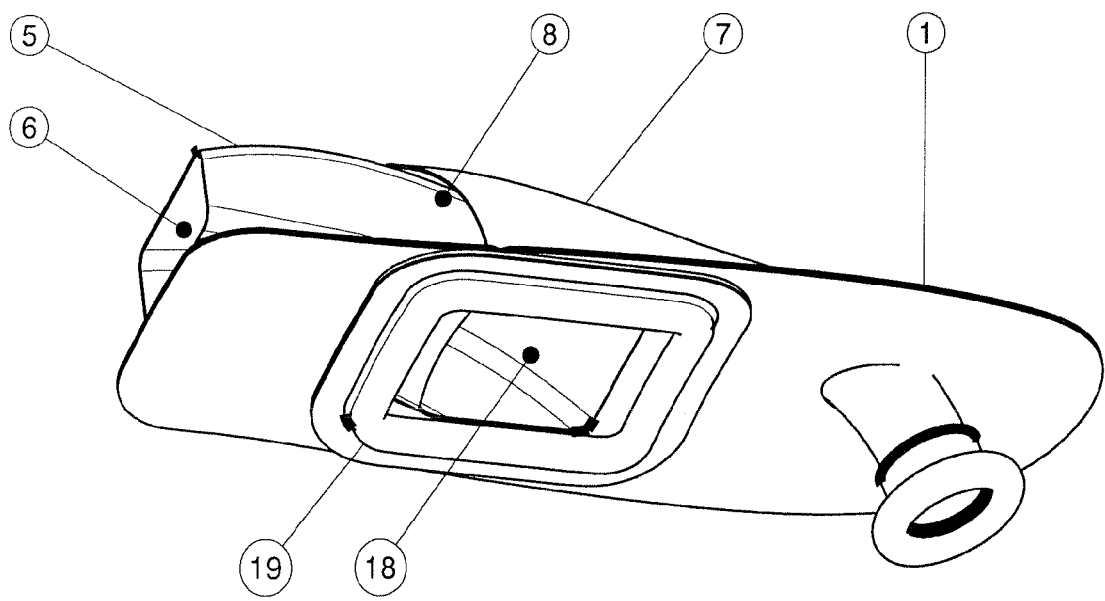

In the following, the present invention is more fully described in light of the accompanying drawings showing a preferred embodiment. In the drawings, FIG. 1 is a simplified partial sectional view in the axial direction of an aircraft gas turbine using the scoop according to the present invention, FIGS. 2 and 3 each show a perspective representation of the scoop according to the present invention, FIGS. 4 and 5 are top views of the representations as per FIGS. 2 and 3, FIG. 6 is a simplified longitudinal sectional view of the embodiment shown, FIG. 7 is a radial sectional view along the line Y-Y of FIG. 6, FIG. 8 is a simplified lateral sectional view, especially of the representation of FIG. 6, and FIG. 9 is a perspective bottom view.

FIG. 1 shows in schematic representation an engine nacelle 9 with an intake 10 in which a fan is arranged. The exiting flow of the fan 11 flows into a bypass duct 4 and to a compressor 12 of a core engine 2 including a combustion chamber 13 and a turbine 14. The flow exiting from the turbine 14 and the bypass duct 3 is routed to a thrust nozzle 15. Reference numeral 16 designates an engine axis.

Provided between the core engine 2 and the bypass duct 3 is a core-engine ventilation compartment 4 which is radially outwardly confined by a fairing 1. The fairing 1 is passed by a scoop 17 through which, as described, cooling air is delivered for cooling the running gap by cooling a wall of a turbine casing.

FIGS. 2 to 5 show an exemplary embodiment of the scoop 17 according to the present invention. It includes a first flow duct 5 which has an essentially rectangular cross-section and is provided with an again essentially rectangular inlet opening 6 situated in the bypass duct 3. The first flow duct 5 arcuately extends downwards with essentially constant cross-section and issues into an essentially rectangular outlet opening 18 which can be surrounded by a seal 19 (see FIGS. 8 and 9).

The first flow duct 5 is encompassed or enclosed by a second flow duct 7. The two sideward inlet openings 8 of the latter are backwardly offset in the axial direction resp. in the direction of flow, as illustrated in FIGS. 2 and 3, for example. Accordingly, the second flow duct 5 is of fork-shaped design, with the entering flow bilaterally passing around an exterior of the first flow duct 5 and uniting in the further course to discharge via an outlet opening 20 which again can be surrounded by a seal 21.

FIGS. 2 to 5, in particular, show the respective flow paths. The two double arrows in FIG. 2 show the inflow to the first flow duct 5 and to one side of the second flow duct 7 via the sideward inlet opening 8 thereof (see also FIG. 7). FIG. 3 shows the uniting of the two partial flows entering the second flow duct 7 via the two sideward inlet openings 8. FIG. 4 shows in top view the inflow areas of the first flow duct 5 and the two sideward inflow areas into the second flow duct 7. The course of flow is further illustrated in FIG. 5.

FIGS. 3, 6 and 8 further show that the first flow duct 5, in the area of its inlet opening 6, is arranged at a certain distance from the surface of the fairing 1. This is achieved by means of an aerodynamically favorably shaped spacer 22, preventing the inflow into the inlet opening 6 from being impaired by edge and frictional effects of the fairing 1.

LIST OF REFERENCE NUMERALS

1 Fairing
2 Core engine

3 Bypass duct
4 Core-engine ventilation compartment
5 First flow duct
6 Inlet opening
7 Second flow duct
8 Inlet opening
9 Engine nacelle
10 Intake
11 Fan
12 Compressor
13 Combustion chamber
14 Turbine
15 Thrust nozzle
16 Engine axis
17 Scoop
18 Outlet opening
19 Seal
20 Outlet opening
21 Seal
22 Spacer

What is claimed is:

1. An air scoop of a fairing of a core engine of an aircraft gas turbine through which air can be supplied from a bypass flow in a bypass duct to a plurality of cooling-air distributors in a core-engine ventilation compartment, the scoop comprising:
   a first tubular flow duct having an internal passage and an inlet opening arranged in the bypass duct open to the bypass flow, the first tubular flow duct extending through the fairing;
   a second tubular flow duct having an internal passage and an inlet opening arranged in the bypass duct open to the bypass flow, the internal passage and inlet opening of the second tubular flow duct at least partly encompassing the first tubular flow duct, the inlet opening of the second tubular flow duct offset downstream relative to the inlet opening of the first tubular flow duct with respect to a direction of the bypass flow.

2. The scoop of claim 1, wherein the first tubular flow duct has an essentially rectangular cross-section.

3. The scoop of claim 2, wherein the inlet opening of the first tubular flow duct is spaced away from a wall of the fairing.

4. The scoop of claim 3, wherein the inlet opening of the second tubular flow duct is arranged at a side of the first tubular flow duct.

5. The scoop of claim 4, wherein the second tubular flow duct is fork-shaped and encompasses a rearward part and a portion of both sides of the first tubular flow duct with respect to the bypass flow such that a flow entering and flowing through the second tubular flow duct from the bypass flow bilaterally passes around an exterior of the first tubular flow duct.

6. The scoop of claim 5, wherein the first tubular flow duct issues through the fairing forward of the second tubular flow duct.

7. The scoop of claim 1, wherein the inlet opening of the first tubular flow duct is spaced away from a wall of the fairing.

8. The scoop of claim 7, wherein the inlet opening of the second tubular flow duct is arranged at a side of the first tubular flow duct.

9. The scoop of claim 8, wherein the second tubular flow duct is fork-shaped and encompasses a rearward part and a portion of both sides of the first tubular flow duct with respect to the bypass flow such that a flow entering and flowing through the second tubular flow duct from the bypass flow bilaterally passes around an exterior of the first tubular flow duct.

10. The scoop of claim 9, wherein the first tubular flow duct issues through the fairing forward of the second tubular flow duct.

11. The scoop of claim 1, wherein the inlet opening of the second tubular flow duct is arranged at a side of the first tubular flow duct.

12. The scoop of claim 11, wherein the second tubular flow duct is fork-shaped and encompasses a rearward part and a portion of both sides of the first tubular flow duct with respect to the bypass flow such that a flow entering and flowing through the second tubular flow duct from the bypass flow bilaterally passes around an exterior of the first tubular flow duct.

13. The scoop of claim 12, wherein the first tubular flow duct issues through the fairing forward of the second tubular flow duct.

14. The scoop of claim 1, wherein the second tubular flow duct is fork-shaped and encompasses a rearward part and a portion of both sides of the first tubular flow duct with respect to the bypass flow such that a flow entering and flowing through the second tubular flow duct from the bypass flow bilaterally passes around an exterior of the first tubular flow duct.

15. The scoop of claim 14, wherein the first tubular flow duct issues through the fairing forward of the second tubular flow duct.

16. The scoop of claim 1, wherein the first tubular flow duct issues through the fairing forward of the second tubular flow duct.

* * * * *